(12) United States Patent
Lee et al.

(10) Patent No.: US 11,177,680 B2
(45) Date of Patent: Nov. 16, 2021

(54) FIELD SHAPER FOR A WIRELESS POWER TRANSMITTER

(71) Applicant: INTEL CORPORATION, Santa Clara, CA (US)

(72) Inventors: Jaejin Lee, Beaverton, OR (US); Hao-Han Hsu, Portland, OR (US); Chung-Hao J. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 15/478,501

(22) Filed: Apr. 4, 2017

(65) Prior Publication Data

US 2018/0287411 A1    Oct. 4, 2018

(51) Int. Cl.
*H02J 7/02* (2016.01)
*H02J 50/12* (2016.01)
*H01F 38/14* (2006.01)
*H04B 5/00* (2006.01)
*H01F 27/255* (2006.01)
*H02J 50/10* (2016.01)
(Continued)

(52) U.S. Cl.
CPC .......... *H02J 7/025* (2013.01); *H01F 27/255* (2013.01); *H01F 27/36* (2013.01); *H01F 38/14* (2013.01); *H02J 50/10* (2016.02); *H02J 50/12* (2016.02); *H02J 50/70* (2016.02); *H04B 5/0037* (2013.01); *H04B 5/0081* (2013.01); *B60L 53/12* (2019.02); *H02J 7/00034* (2020.01); *H02J 7/0044* (2013.01); *H02J 50/80* (2016.02); *H04B 5/0031* (2013.01); *H04B 5/0087* (2013.01)

(58) Field of Classification Search
CPC .. H02J 7/025; H02J 50/12; H02J 50/80; H02J 50/90; H01F 27/255; H01F 27/365; H01F 27/253
USPC ........................................................ 320/108
See application file for complete search history.

(56) References Cited

U.S. PATENT DOCUMENTS 3,577,109 A * 5/1971 Foster ............... H01F 27/365
                                                336/84 R
5,617,269 A * 4/1997 Gordenker ............ G11B 5/584
                                                360/121
(Continued)

OTHER PUBLICATIONS

D. W. Lee and S. X. Wang, "Effects of Geometries on Permeability Spectra of CoTaZr Magnetic Cores for High Frequency Applications", Journal of Applied Physics, 103, 07E907, 2008, 4 pages, USA.

(Continued)

*Primary Examiner* — David V Henze-Gongola
*Assistant Examiner* — Tarikh Kanem Rankine
(74) *Attorney, Agent, or Firm* — Schiff Hardin LLP

(57) ABSTRACT

Techniques for focusing the energy radiated by a wireless power transmitting unit are described. An example power transmitting unit includes a transmit coil configured to generate a magnetic field to wirelessly power a device within an active wireless charging area. The power transmitting unit also includes a power generating circuitry to deliver current to the transmit coil to generate the magnetic field. The power transmitting unit also includes a ferrite structure disposed below the transmit coil, the ferrite structure comprising a flat sheet and a projection of ferrite material projecting above the flat sheet.

19 Claims, 17 Drawing Sheets

(51) Int. Cl.
  *H02J 50/70*    (2016.01)
  *H01F 27/36*    (2006.01)
  *H02J 50/80*    (2016.01)
  *B60L 53/12*    (2019.01)
  *H02J 7/00*     (2006.01)

(56) References Cited

U.S. PATENT DOCUMENTS

| | | | |
|---|---|---|---|
| 6,586,936 B2* | 7/2003 | Pittaluga | G01R 33/383 324/319 |
| 9,726,518 B2* | 8/2017 | Widmer | B60L 50/16 |
| 2005/0052267 A1* | 3/2005 | Singu | H01F 17/045 336/83 |
| 2006/0209487 A1 | 9/2006 | Schmidt et al. | |
| 2008/0067874 A1* | 3/2008 | Tseng | A61C 17/224 307/104 |
| 2008/0129246 A1* | 6/2008 | Morita | B60L 5/005 320/108 |
| 2009/0160262 A1* | 6/2009 | Schmidt | H01F 27/2847 307/104 |
| 2011/0234155 A1* | 9/2011 | Chen | A61N 1/3787 320/108 |
| 2012/0007437 A1* | 1/2012 | Fells | H04B 5/0037 307/104 |
| 2012/0025758 A1 | 2/2012 | Bohori et al. | |
| 2012/0074233 A1* | 3/2012 | Finn | G06K 19/07756 235/492 |
| 2013/0026850 A1* | 1/2013 | Throngnumchai | B60L 53/12 307/104 |
| 2013/0249302 A1* | 9/2013 | An | H02J 50/70 307/104 |
| 2013/0270921 A1* | 10/2013 | Boys | H02J 7/0047 307/104 |
| 2013/0335281 A1* | 12/2013 | Dokai | H01Q 9/06 343/748 |
| 2014/0042824 A1* | 2/2014 | Fells | H01F 38/14 307/104 |
| 2014/0111290 A1* | 4/2014 | Stevens | H04B 5/0012 333/236 |
| 2014/0327391 A1* | 11/2014 | Niederhauser | B60L 11/182 320/108 |
| 2014/0361631 A1* | 12/2014 | Gotani | H01F 38/14 307/104 |
| 2015/0091519 A1* | 4/2015 | Komma | H01F 27/24 320/108 |
| 2015/0170832 A1* | 6/2015 | Covic | H01F 27/38 307/104 |
| 2015/0179330 A1* | 6/2015 | Nakanoue | H01F 27/263 336/5 |
| 2015/0224323 A1* | 8/2015 | Chen | H02J 50/70 607/61 |
| 2015/0302985 A1* | 10/2015 | Kurs | H01F 38/14 307/104 |
| 2016/0001663 A1 | 1/2016 | Chae et al. | |
| 2016/0005531 A1* | 1/2016 | Sullivan | H01F 17/0013 307/104 |
| 2016/0064141 A1* | 3/2016 | Graham | H01F 27/365 336/84 M |
| 2016/0072296 A1* | 3/2016 | Nejatali | H02J 7/025 307/104 |
| 2016/0099577 A1 | 4/2016 | Park et al. | |
| 2016/0181826 A1 | 6/2016 | Badr et al. | |
| 2016/0268847 A1* | 9/2016 | Yuasa | H01F 27/28 |
| 2017/0036552 A1* | 2/2017 | Yuasa | H01F 38/14 |
| 2017/0040098 A1* | 2/2017 | Yuasa | H01F 3/10 |
| 2017/0040696 A1* | 2/2017 | Peralta | H02J 50/12 |
| 2017/0040840 A1* | 2/2017 | Yuasa | H01F 38/14 |
| 2017/0054213 A1* | 2/2017 | Singh | H04B 5/0081 |
| 2017/0093199 A1* | 3/2017 | Pinciuc | H02J 50/90 |
| 2017/0353061 A1* | 12/2017 | Maniktala | H02J 50/90 |
| 2018/0204675 A1* | 7/2018 | Wirth | H01F 3/10 |
| 2019/0004012 A1* | 1/2019 | Khalaj Amineh | G01N 27/87 |

OTHER PUBLICATIONS

International Search Report for International PCT Application PCT/US2018/020467 filed Mar. 1, 2018, dated Jun. 15, 2018, 3 pages.

* cited by examiner

FIELD SHAPER FOR A WIRELESS POWER TRANSMITTER

TECHNICAL FIELD

This disclosure relates generally to techniques for wireless power transfer. Specifically, this disclosure relates to techniques for containing the electromagnetic field generated by a wireless power transmitter.

BACKGROUND

A basic wireless power transfer system may include a wireless power transmitter unit (PTU) and a wireless power receiving unit (PRU). A PRU may be implemented in a mobile computing device, such as a laptop, tablet or smart phone, which can be placed on a charging mat equipped with a PTU. The PTU may include a transmit (Tx) coil and a PRU may include a receive (Rx) coil. In typical wireless power transfer systems, the transmit coil creates an alternating electromagnetic field and the receive coil takes power from the electromagnetic field and converts it back into electrical current to charge the battery and/or power the device.

Two common techniques for wireless power transfer are referred to as inductive charging and magnetic resonance charging. In inductive charging, the transmit and receive coils are tightly coupled and operate like two windings of a transformer. In magnetic resonance charging, the transmit and receive coils are loosely coupled and both coils are tuned to the same resonant frequency to improve efficiency. In some circumstances, the electromagnetic field generated by the transmit coil may be transmitted to areas that are outside of the wireless charging area. This energy is wasted and may interfere with other electronic components.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for shaping the electromagnetic field generated by a transmit coil of a wireless charging device. As mentioned above, the electromagnetic field generated by the transmit coil may tend to be transmitted to unwanted areas in some cases. Regulatory agencies have defined regulations that limit the amount of electromagnetic energy that can be transmitted to the surroundings. One such regulation, referred to as ElectroMagnetic Compatibility (EMC), controls allowable emissions and limits ElectroMagnetic (EM) energy levels to avoid interference with other electronics. Another regulation, referred to as the Specific Absorption Ratio (SAR), specifies maximum permissible exposure of EM energy to the human body.

Recently, there have been efforts to incorporate wireless power transfer systems into desks and tables. By incorporating wireless charging pads into the tables, computing device users will have a convenient charging experience and a wire-free environment. To ensure compatibility with the SAR standards, various techniques may be used to reduce the electromagnetic radiation from the backside of the transmitting coil.

The present disclosure provides a technique for shaping the electromagnetic field radiated by a transmit coil. The technique uses a ferrite structure with high magnetic permeability disposed below the transmit coil. The ferrite structure is a flat sheet with one or more projections of ferrite material disposed at or near the center of the charging area of the transmit coil. The ferrite structure controls the magnetic flux path to increase the electromagnetic field strength inside the charging area while reducing the electromagnetic field strength outside of the charging area. In this way, transmission efficiency for the wireless power transfer system is increased while suppressing unwanted EMI emission from the transmit coil. In some embodiments, a patch array is disposed below the ferrite structure. The patch array is configured to appear relatively transparent to electromagnetic energy at the operating frequency of the wireless power transmission system. At other frequencies, the patch array appears more like a solid conductive sheet and further reduces unwanted radiative emissions.

The techniques described herein may be implemented in part using a wireless charging standard protocol, such as a specification provided by the Airfuel Alliance, Wireless Power Consortium (WPC), and others. However, the techniques described herein may be implemented using any other wireless charging standard protocol where applicable. The techniques described herein may be implemented in systems that use inductive charging or magnetic resonance charging.

Figure 1:
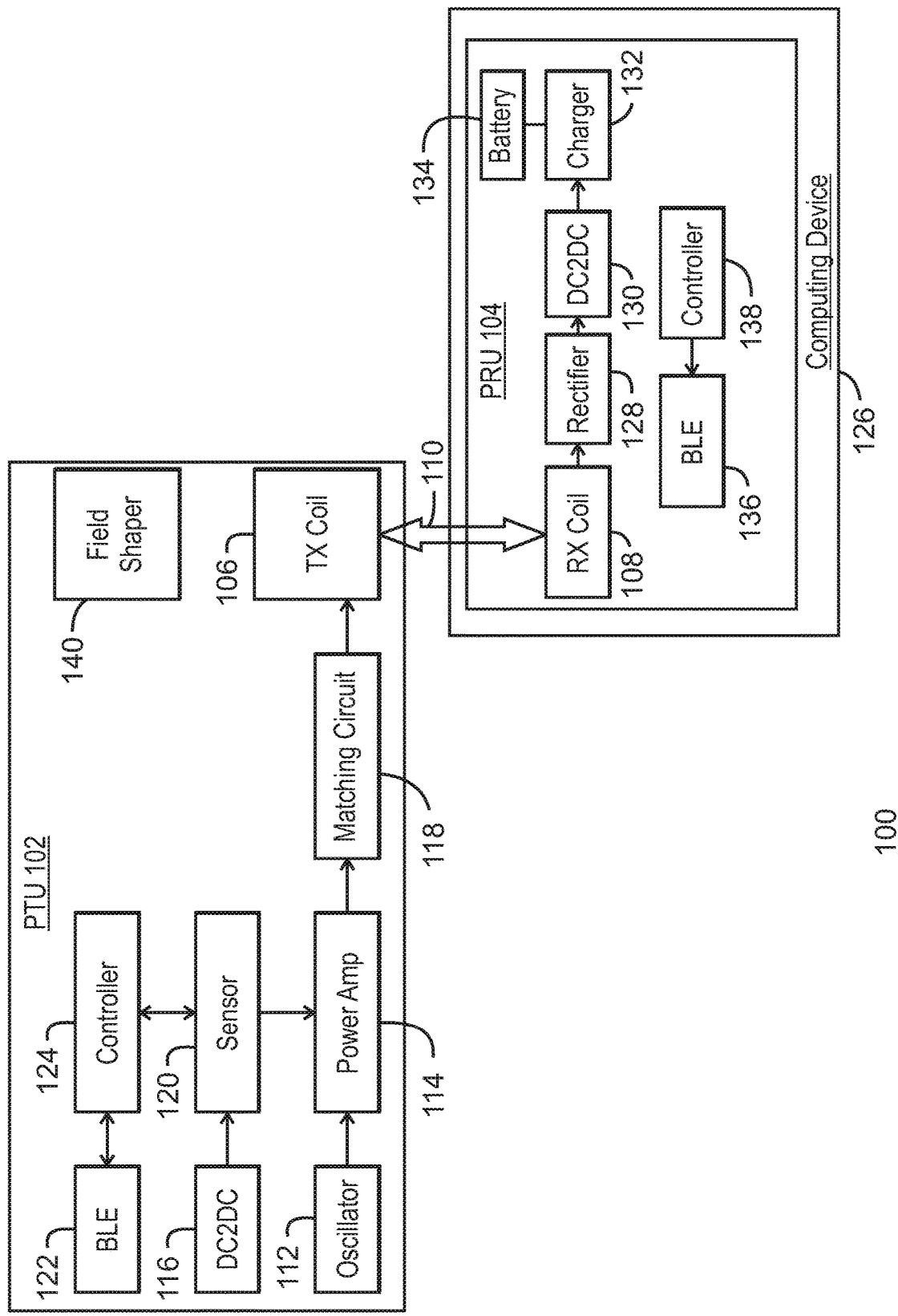
FIG. 1 is block diagram of a PTU to provide power to a PRU.

FIG. 1 is block diagram of a PTU to provide power to a PRU. A PTU 102 may be coupled to a PRU 104 via magnetic coupling between two resonators referred to herein as the transmit coil 106 and the receive coil 108, as indicated by the arrow 110. During operation, the transmit coil 106 and the receive coil 108 may be tightly coupled, as in inductive charging, or loosely coupled, as in magnetic resonance charging.

The PTU 102 may include an oscillator 112, a power amplifier 114, a Direct Current to Direct Current (DC2DC) converter 116, and a matching circuit 118. The oscillator 112 is configured to generate a periodic oscillating electrical signal at a specified frequency used for wireless power transfer. The specified frequency is referred to herein as the operating frequency. The power amplifier 114 receives direct current power from the DC2DC converter 116, and amplifies the signal received from the oscillator 112. The matching circuit 118 matches the impedance of the power amplifier 114 to the impedance of the transmit coil 106 to ensure efficient power transmission. The matching circuit 118 may include any suitable arrangement of electrical components such as capacitors, inductors, and other circuit elements that can be adjusted to impedance match the transmit coil 106 to the power amplifier 114. In some examples, the PTU 102 may be embedded with a desk or table.

Other components of the PTU may include a current sensor 120, a Bluetooth Low Energy (BLE) module 122, a controller 124, and others. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 124 of the PTU 102. The controller 124 can be configured to control various aspects of the operation of the PTU 102. For example, the controller 124 can set a frequency, and/or power level of the power radiated by the transmit coil 106. The controller 124 can also control communications between the PTU 102 and the PRU 104 through the BLE module 122.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux that passes through the receive coil 108. The rectifier 128 receives an alternating current (AC) voltage from the receive coil 108 and generates a rectified DC voltage (Vrect). The DC2DC converter 130 receives the rectified voltage from the rectifier 128, converts the voltage to a suitable voltage level, and provides the output to the battery charger 132. The battery 134 powers the various platform hardware of the computing device 126. The platform hardware includes the processors, working memory, data storage devices, communication buses, I/O interfaces, communication devices, display devices, and other components that make up the computing device 126.

The PRU 104 may also include a Bluetooth Low Energy (BLE) module 136 and a controller 138. The controller 138 is configured to perform a wireless handshake with the PTU 102. As discussed above, the wireless handshake broadcast may be performed through the BLE modules 122 and 136 or other wireless data transmission component. Various types of information may be transmitted during the wireless handshake, including power budget, wireless charging capabilities, size of the computing device 126, and other information.

The PTU 102 also includes a field shaper 140. The field shaper 140 includes the ferrite structure described further below. The field shaper controls the magnetic flux path to increase the electromagnetic field strength inside the charging area while reducing the electromagnetic field strength outside of the charging area. In some embodiments, the field shaper 140 also includes a patch array shield disposed above the ferrite structure. The patch array is frequency selective. Specifically, the patch array appears relatively transparent to electromagnetic energy radiated at the operating frequency. This reduces the effects of the patch array on the desired electromagnetic transmissions. At other frequencies, the patch array appears more like a solid conductive sheet and reduces unwanted radiative emissions. Some examples of patch arrays in accordance with the present techniques are described further below in relation to FIGS. 11-16.

The block diagram of FIG. 1 is not intended to indicate that the PTU 102 and/or the PRU 104 are to include all of the components shown in FIG. 1. Further, the PTU 102 and the PRU 104 may include any number of additional components not shown in FIG. 1, depending on the details of the specific implementation.

Figure 2:
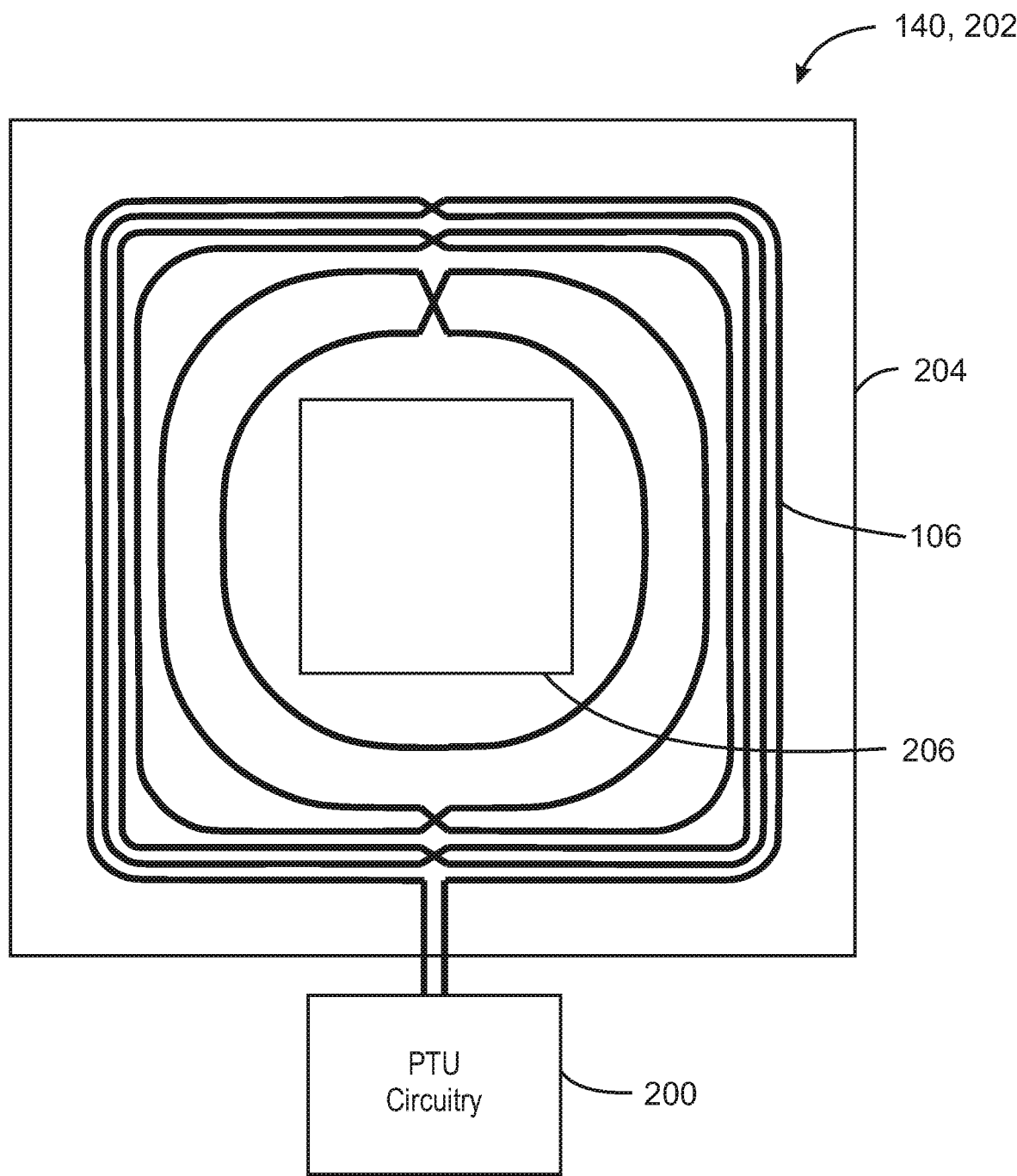
FIG. 2 is an example of transmit coil with a field shaper.

FIG. 2 is an example of transmit coil with a field shaper. The transmit coil 106 can include one or more conductive turns configured to receive current from the PTU circuitry 200. The PTU circuitry 200 may include the components described in relation to FIG. 1, such as the oscillator 112, the power amplifier 114, the DC2DC converter 116, the matching circuit 118, and others. Current flowing on the conductive turns generates the magnetic field used for wireless charging. The transmit coil shown in FIG. 2 includes several turns spaced at specific distances. The number of turns, the shape of the turns, and the spacing between the turns may be selected to focus the electromagnetic field within the active charging area. However, the specific arrangement shown in FIG. 1 is not a limitation of the present techniques. The current techniques can be implemented using any suitable type of transmit coil with any number, shape, or spacing of turns.

In relation to the transmit coil 106, there is a defined area above the transmit coil referred to herein as the active charging area. The active charging area is where PRUs 104 are supposed to be placed so that the PTU 102 will be activated and begin generating an oscillating magnetic field to charge the PRU 104. Typically, the magnetic field is maintained at a relatively uniform and strong level within the active charging area. Outside the charging area, the magnetic field weakens with distance. In some examples, the active charging area will be about equal to the area bounded by the transmit coil or the outer turn if there is more than one.

Below the transmit coil 106 is an example embodiment of a field shaper 140. In this example, the field shaper 140 is a ferrite structure 202 that includes a flat peripheral sheet 204 below the transmit coil 106 and a projection 206 at the center of the ferrite structure 202 and aligned with the center of the transmit coil 106. The ferrite structure 202 may be made of any suitable high-permeability, low-loss ferromagnetic material, including iron, nickel, copper, spinel ferrites, hexagonal ferrites, and others. The projection 206 shown in FIG. 2 is a square projection. However, it will be appreciated that other shapes are also possible, including a round projection, square with rounded edges, and others. Additional features of the ferrite structure 202 may be better understood with reference to FIG. 3.

Figure 3:
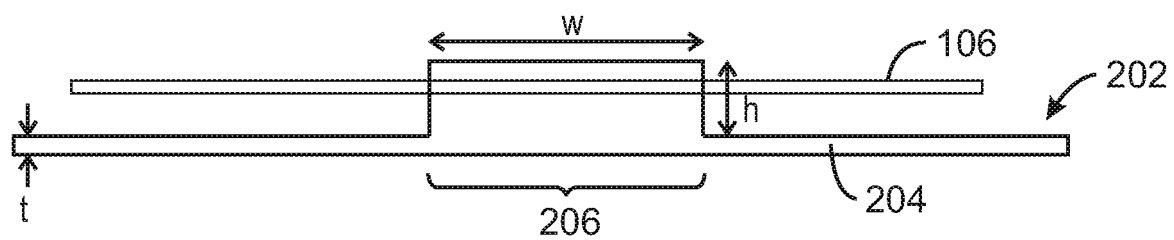
FIG. 3 is a side view of the transmit coil and field shaper shown in FIG. 2.

FIG. 3 is a side view of the transmit coil and field shaper shown in FIG. 2. As shown in FIG. 3, the projection 206 of the ferrite structure 202 has a specified width, w, and height, h. The width and height of the projection 206 may be selected based on the desired field strength characteristics inside the charging area. In an example embodiment, the width may be approximately 50 mm and the height may be approximately 8 mm. However, the height and width may be different depending on the design details of a specific implementation. The width and height may be tuned for a specific implementation based on measured and/or simulated field characteristics provided by the ferrite structure 202 and transmit coil 106 combination. The thickness, t, of the flat peripheral sheet 204 may be approximately 1 millimeters.

Additionally, the height of the transmit coil 106 above the ferrite structure 202 may be specified to achieve desired field characteristics. In the embodiment shown in FIG. 3, the height of the transmit coil 106 above the flat peripheral sheet 204 of the ferrite structure 202 is lower than the height of the projection 206, and the projection 206 breaks the plane of the transmit coil 106. In some example embodiments, the height of the transmit coil 106 above the flat peripheral sheet 204 of the ferrite structure 202 is lower than the height of the projection 206, so that the transmit coil 106 sits above the top of the projection 206. In some example, the transmit coil 106 may rest directly on top of the flat peripheral sheet 204 of the ferrite structure 202.

The transmit coil 106 tends to produce a large magnetic field near the center of the transmit coil 106. The effect of the projection 206 at the center of the ferrite structure 102 is to further intensify the magnetic field near the center of the transmit coil 106.

Figure 4:
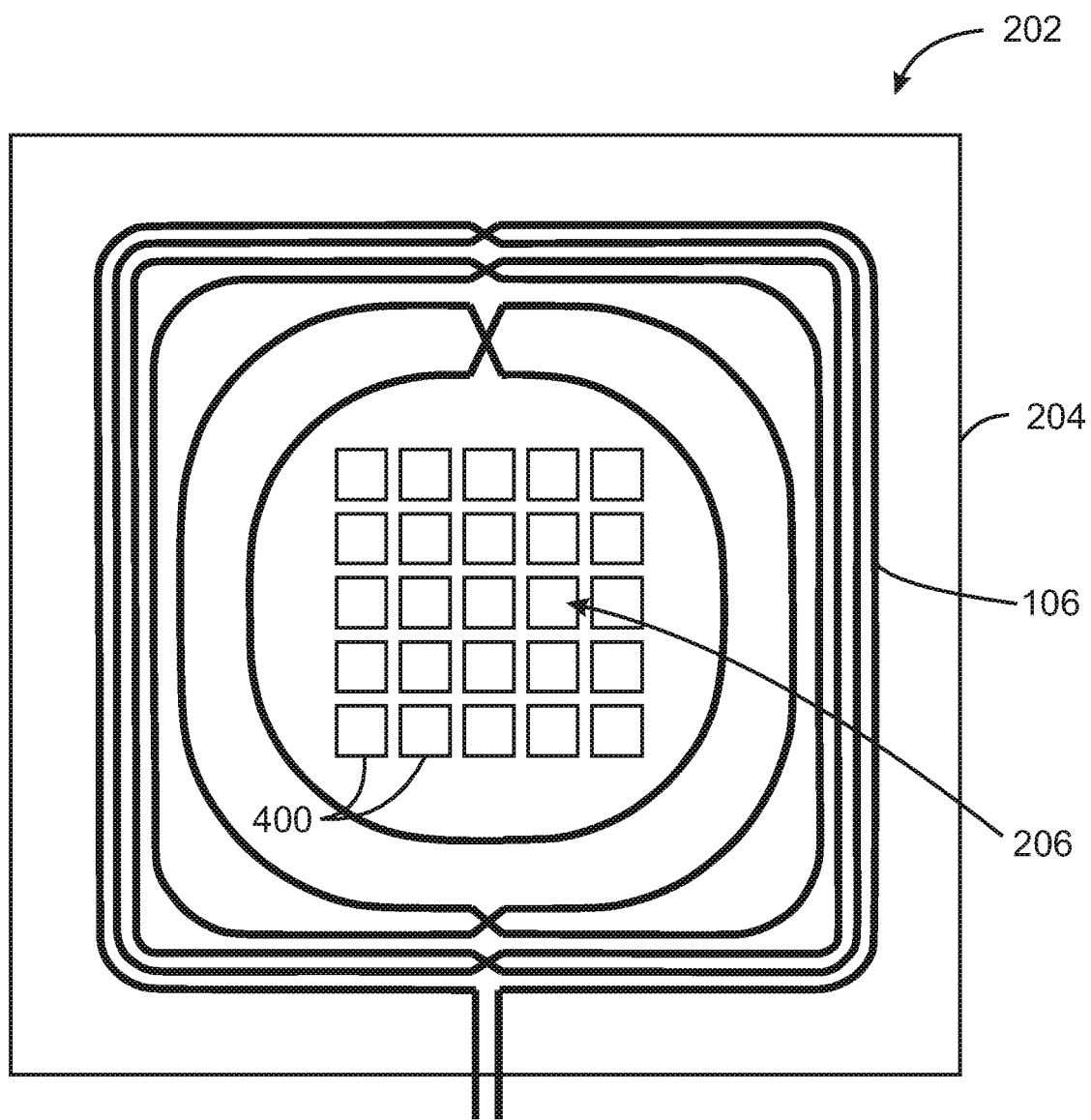
FIG. 4 is another example of transmit coil with a field shaper.

FIG. 4 is another example of transmit coil with a field shaper. The field shaper 140 is another ferrite structure 202 which is substantially similar to ferrite structure 202 described in relation to FIGS. 2 and 3. The ferrite structure 202 includes the flat peripheral sheet 204 below the transmit coil 106 and a projection 206 at the center of the ferrite structure 202 and aligned with the center of the transmit coil 106. However, the projection 206 at the center of the ferrite structure 202 is a matrix of individual fingers 400. The fingers 400 may be any suitable shape. Furthermore, although a 5-by-5 matrix of fingers 400 is shown, the projection 206 may be divided into any suitable number of fingers, including 2-by-2, 3-by-3, 4-by-4, 6-by-6, or more. Additional features of the ferrite structure 202 may be better understood with reference to FIG. 5.

Figure 5:
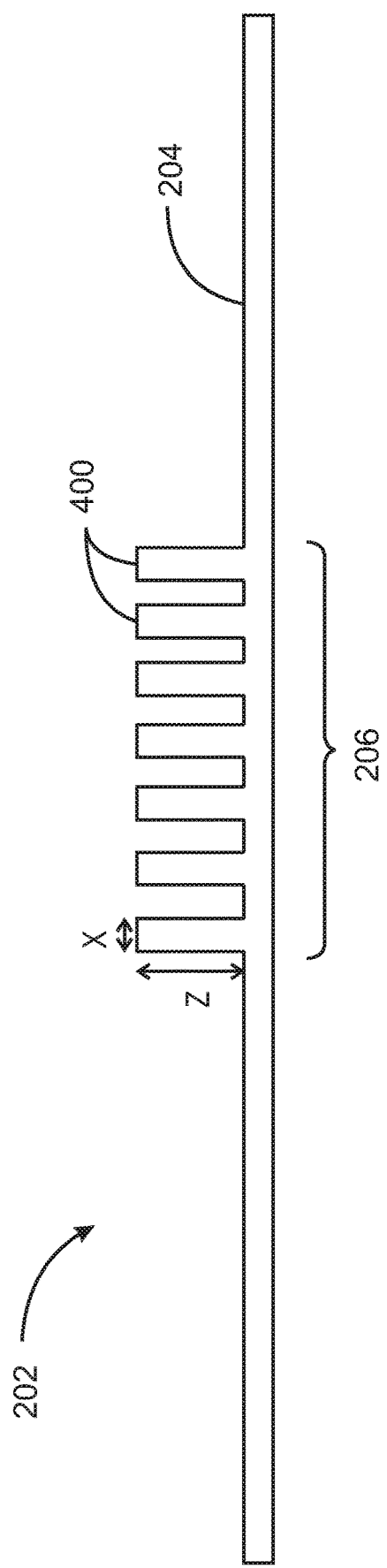
FIG. 5 is a side view of the field shaper shown in FIG. 4.

FIG. 5 is a side view of the field shaper shown in FIG. 4. As shown in FIG. 5 projection 206 of the ferrite structure 202 includes an array of fingers 400 with equal height, z, and a width, x. The height, z, and width, x, may be selected to provide a high aspect ratio, a, which is equal to the height divided by the width (a=z/x). The aspect ratio may be greater than or equal to 1 and may be in the range from 1 to 10.

The magnetic field (Hz) and the effective permeability along the vertical Z-direction ($\mu_{eff,z}$) both increase with decreasing demagnetization factor ($N_z$) according to equations (1) and (2). In the below equations, M is magnetization and $\mu_r$ is relative permeability.

$$Hz = 4\pi M(1-N_z) \quad \text{Eq. 1}$$

$$\mu_{eff,z} = \frac{\mu_r}{1+N_z(\mu_r-1)} \quad \text{Eq. 2}$$

The demagnetization factor may be computed according to Equation 3 and decreases with increasing aspect ratio.

$$N_z = \frac{1}{(a^2-1)}\left[\frac{a}{\sqrt{a^2-1}}\ln(a+\sqrt{a^2-})-1\right] \quad \text{Eq. 3}$$

Accordingly, the ferrite structure with large aspect ratio can improve magnetic field intensity and uniformity in the charging area. The width, x, and height, z, may be tuned for a specific implementation based on measured and/or simulated field characteristics provided by the field shaper and transmit coil combination.

Figure 6:
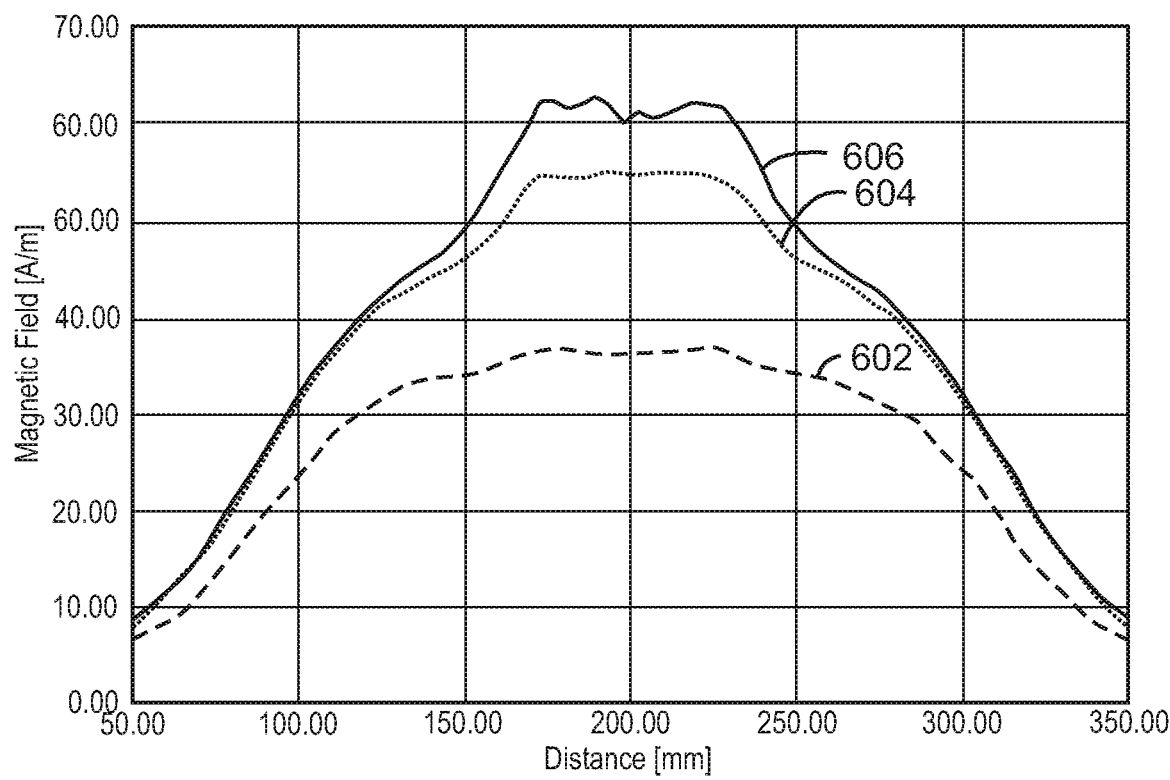
FIG. 6 is a graph of the magnetic field strength for a transmit coil with a high aspect ratio ferrite structure.

FIG. 6 is a graph of the magnetic field strength for a transmit coil with a high aspect ratio ferrite structure. More specifically, the graph of FIG. 6 represents simulated magnetic field values for a transmit coil with high aspect ratio ferrite structure of the type shown in FIGS. 4 and 5. The X-axis represents distance across the transmit coil in the x-direction, wherein the center of the coil is at 200 mm The Y-axis represents the simulated magnetic field strength measured in Amperes per meter at a constant distance above the transmit coil.

The dashed line 602 represents the magnetic field strength for a transmit coil with a completely flat ferrite sheet, i.e., with no projections. The dotted line 604 and solid line 606 represent a transmit coil with a ferrite structure of the type described above in relation to FIGS. 4 and 5. More specifically, the dotted line 604 represents a ferrite structure with fingers that have an aspect ratio of 1. The dotted line 606 represents a ferrite structure with fingers that have an aspect ratio of 10. The results shown in FIG. 6 demonstrate that as the aspect ratio of the fingers increases, the magnetic field intensity increases.

Figure 7:
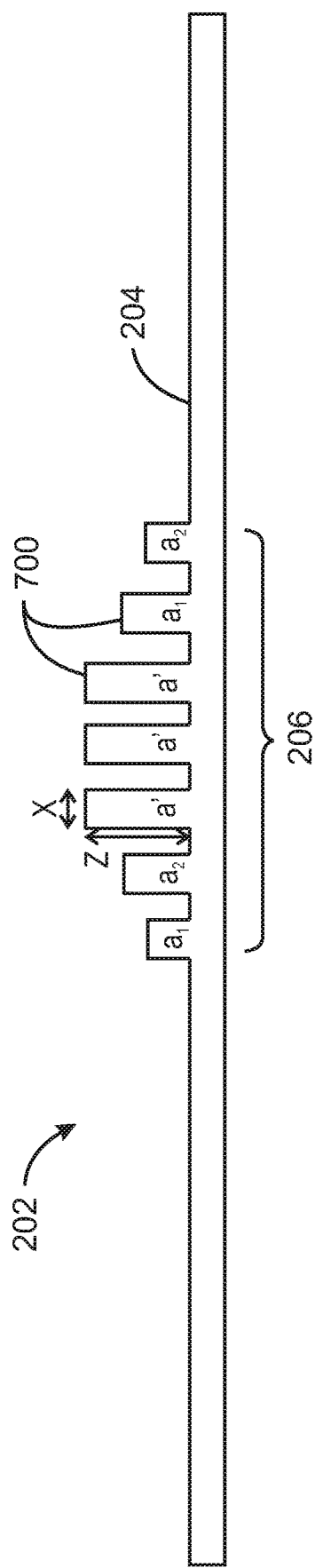
FIG. 7 is another example of a field shaping ferrite structure.

FIG. 7 is another example of a field shaping ferrite structure. For the sake of simplicity, only the side view is shown. However, it will be appreciated that the top view may look substantially similar to the top view of FIG. 4. The ferrite structure 202 shown in FIG. 7 is substantially similar to ferrite structure 202 described in relation to FIGS. 4 and 5. The ferrite structure 202 includes the flat peripheral sheet 204 below the transmit coil 106 and a projection 206 at the center of the ferrite structure 202 and aligned with the center of the transmit coil 106. Additionally, the projection 206 at the center of the ferrite structure 202 is a matrix of individual fingers 700.

However, in the embodiment of FIG. 7, the fingers 700 are not uniformly the same height. In this embodiment, the height (z) of the fingers 700 is higher near the center of the projection 206 and lower at the outer portions of the projection 206. The width (x) of the fingers is the same for each finger. Therefore, the aspect ratio, a, is higher toward the center of the projection 206. More specifically, FIG. 7 shows three aspect ratios, a1, a2, and a'. In an example embodiment, a1 may equal 2, a2 may equal 7, and a' may equal 10. Other arrangements are also possible depending on the desired field characteristics. Providing different aspect ratios for each of the fingers enables the field characteristics to be tuned to a desired set of characteristics. For example, placing higher aspect ratio fingers toward the center of the projection can focus the magnetic field near the center of the charging area.

Figure 8:
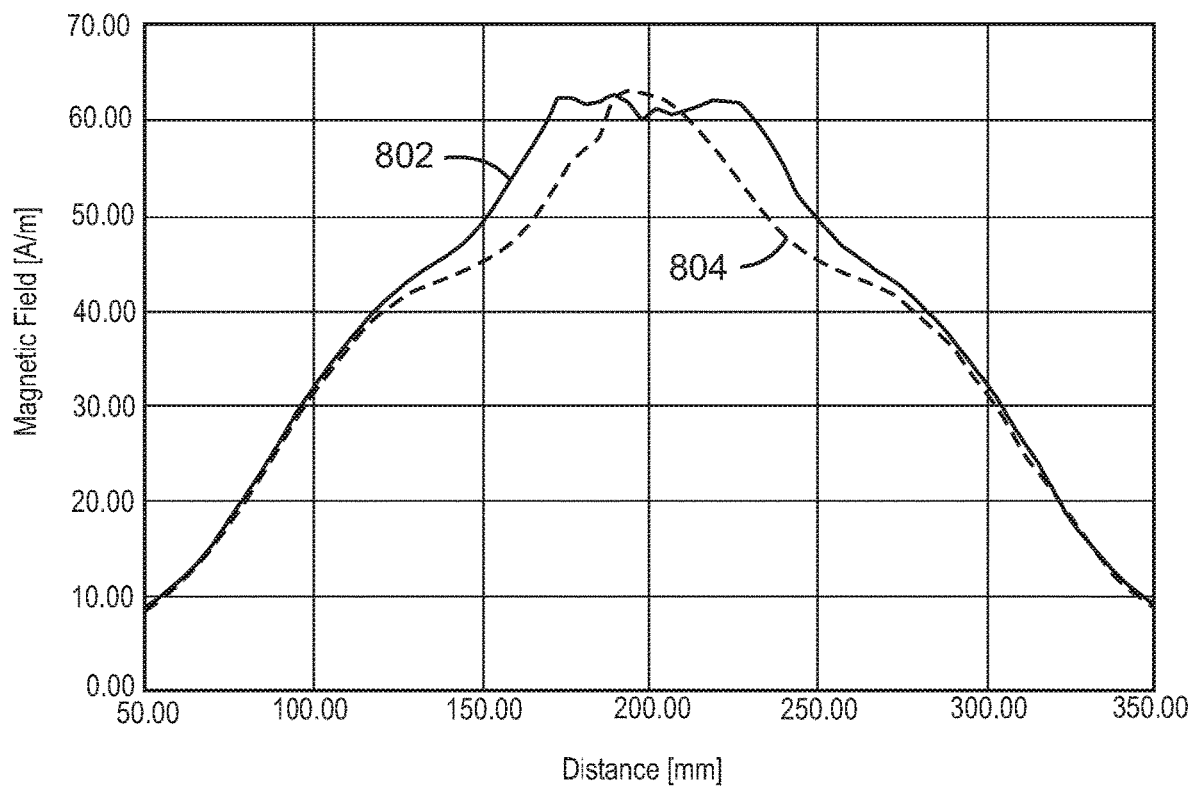
FIG. 8 is a graph of the magnetic field strength for a transmit coil with the field shaping ferrite structure of FIG. 7.

FIG. 8 is a graph of the magnetic field strength for a transmit coil with the field shaping ferrite structure of FIG. 7. The X-axis represents distance across the transmit coil in the x-direction, wherein the center of the coil is at 200 mm. The Y-axis represents the simulated magnetic field strength measured in Amperes per meter at a constant distance above the transmit coil.

The solid line 802 represents the magnetic field strength for a transmit coil with a ferrite structure with equal size fingers as shown in FIG. 5 and having an aspect ratio of 10 (compare to FIG. 6, line 606). The dashed line 804 represents the magnetic field strength for a transmit coil with a ferrite structure with fingers of variable aspect ratio, as shown in FIG. 7. The results shown in FIG. 8 demonstrate that increasing the aspect ratio of the fingers toward the center of the projection compared to fingers toward the periphery of the projection has the effect of focusing the magnetic field toward the center of the projection.

Figure 9:
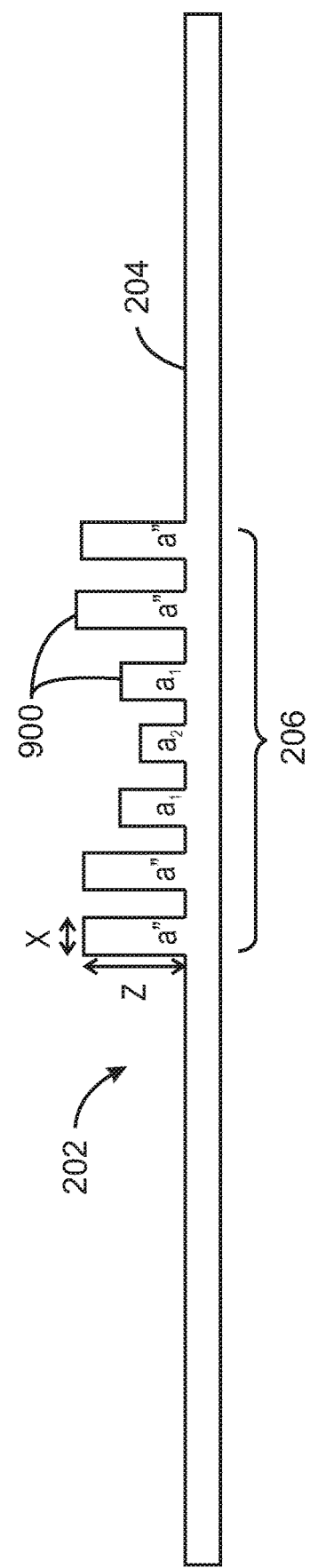
FIG. 9 is another example of a field shaping ferrite structure.

FIG. 9 is another example of a field shaping ferrite structure. For the sake of simplicity, only the side view is shown. However, it will be appreciated that the top view may look substantially similar to the top view of FIG. 4. The ferrite structure 202 shown in FIG. 9 is substantially similar to ferrite structure 202 described in relation to FIGS. 4 and 5. The ferrite structure 202 includes the flat peripheral sheet 204 below the transmit coil 106 and a projection 206 at the center of the ferrite structure 202 and aligned with the center of the transmit coil 106. Additionally, the projection 206 at the center of the ferrite structure 202 is a matrix of individual fingers 900.

However, in the embodiment of FIG. 9, the height (z) of the fingers 900 is higher near the periphery of the projection 206 and lower near the center of the projection 206. The width (x) of the fingers is the same for each finger. Therefore, the aspect ratio, a, is lower toward the center of the projection 206. More specifically, FIG. 9 shows three aspect ratios, a1, a2, and a". In an example embodiment, a1 may equal 7, a2 may equal 2, and a" may equal 10. Other arrangements are also possible depending on the desired field characteristics. Placing lower aspect ratio fingers toward the center of the projection can reduce the magnetic field near the center of the charging area and refocus the magnetic field toward the edges of the projection.

Figure 10:
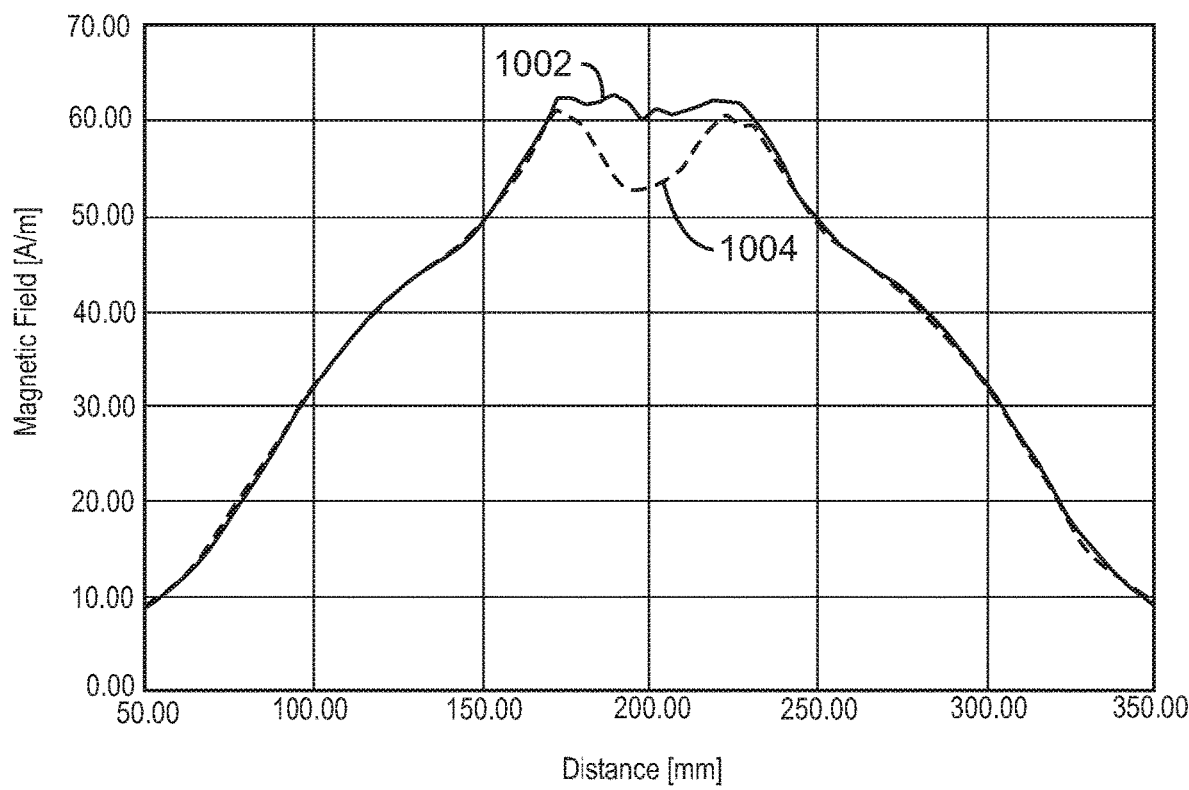
FIG. 10 is a graph of the magnetic field strength for a transmit coil with the field shaping ferrite structure of FIG. 9.

FIG. 10 is a graph of the magnetic field strength for a transmit coil with the field shaping ferrite structure of FIG. 9. The X-axis represents distance across the transmit coil in the x-direction, wherein the center of the coil is at 200 mm. The Y-axis represents the simulated magnetic field strength measured in Amperes per meter at a constant distance above the transmit coil.

The solid line 1002 represents the magnetic field strength for a transmit coil with a ferrite structure with equal size fingers as shown in FIG. 5 and having an aspect ratio of 10 (compare to FIG. 6, line 606). The dashed line 1004 represents the magnetic field strength for a transmit coil with a ferrite structure with fingers of variable aspect ratio, as shown in FIG. 9. The results shown in FIG. 10 demonstrate that decreasing the aspect ratio of the fingers toward the center of the projection compared to fingers toward the periphery of the projection has the effect of decreasing the magnetic field near the center of the projection and focusing the magnetic field toward the edges of the projection.

Figure 11:
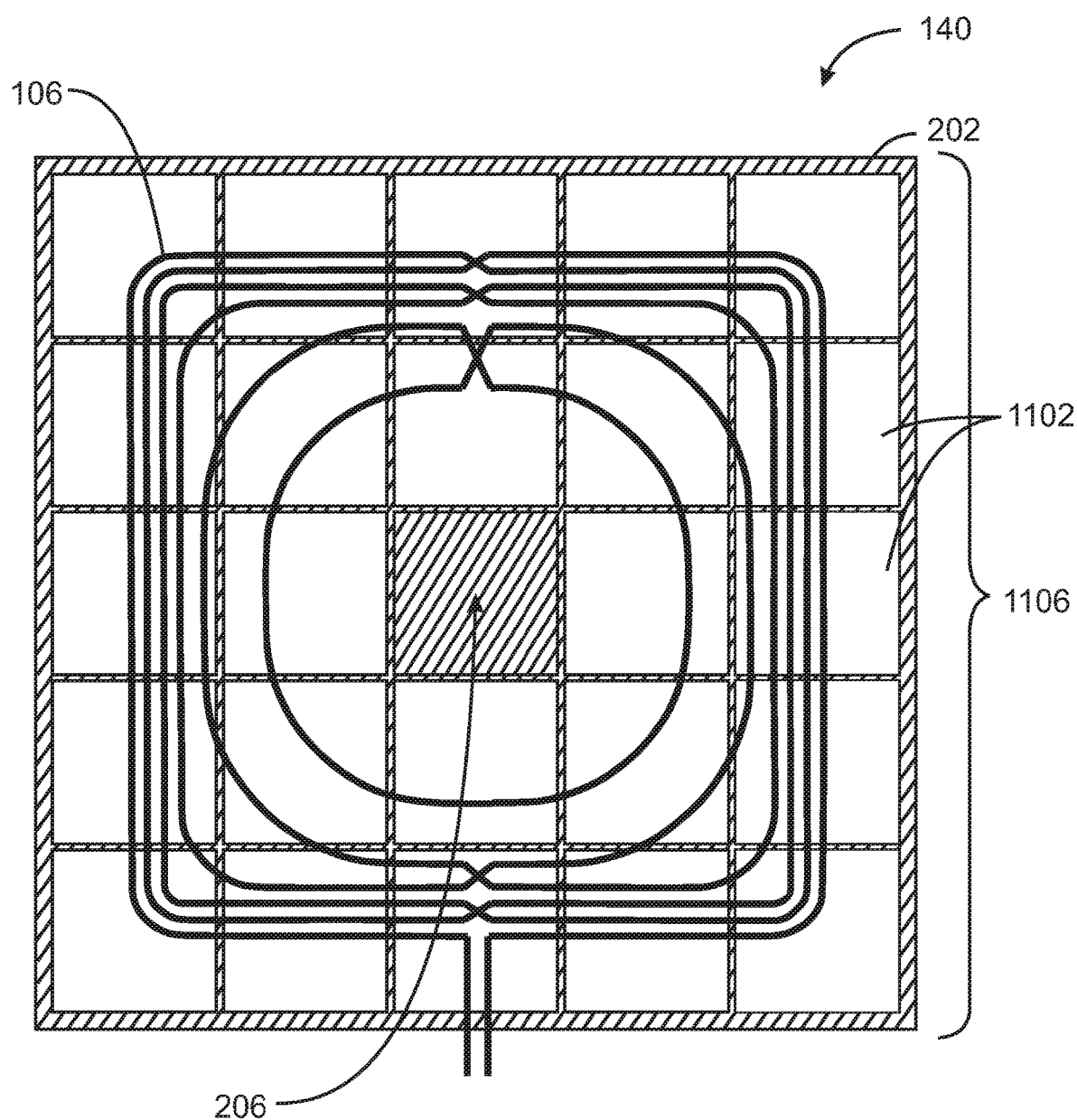
FIG. 11 is another example of a transmit coil with a field shaper.

FIG. 11 is another example of a transmit coil with a field shaper. In this example, the field shaper 140 includes a ferrite structure 202 and a patch array 1100 disposed above the ferrite structure 202. The ferrite structure 202 may be any of the ferrite structures described above in relation to FIGS. 2-10 and includes the projection 206. The patch array 1110 includes a matrix of conductive patches 1102 arranged side-by-side below and parallel to the transmit coil 106. The transmit coil 106 is disposed above the patch array 1100. The patch array 1100 includes an opening at the center, which allows the projection 206 to project through the center of the patch array 1100. The arrangement of the patch array 1100 and ferrite structure 202 may be better understood with reference to FIG. 12.

Figure 12:
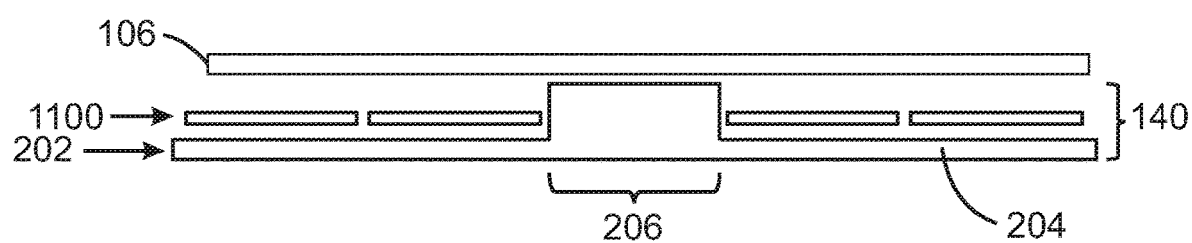
FIG. 12 is a side view of the field shaper 140 shown in FIG. 11.

FIG. 12 is a side view of the field shaper 140 shown in FIG. 11. As shown in FIG. 12, the patch array 1100 sits below the transmit coil 106 and above the flat peripheral sheet 204 of the ferrite structure 202. The projection 206 projects through the center of the patch array 1100. The patch array 1100 is configure to reduce electromagnetic energy below the transmit coil 106. The patch array 1100 is frequency selective, meaning that its electrical characteristics are different at different frequencies. At the operating frequency, the patch array 1100 behaves more transparently to the electromagnetic energy, which reduces the degradation of the magnetic field above the transmit coil 106 at the operating frequency. At other frequencies, the patch array 1100 behaves more like a solid conductor and thus reduces the magnetic field above and below the patch array 1100 and the transmit coil 106 at frequencies other that the operating frequency.

The frequency selectivity may be accomplished by coupling the patches 1102 to one another with a specific inductance and capacitance to create a parallel LC resonant circuit between each patch 1102. In some examples, the LC circuit is created using inductors and capacitors as discrete circuit elements. In some examples, the LC circuit is created by the patch array's structure, such as the spacing between the patches 1102 and other factors. Some examples of frequency selectivity patch arrays are described further in relation to FIGS. 13.

Figure 13:
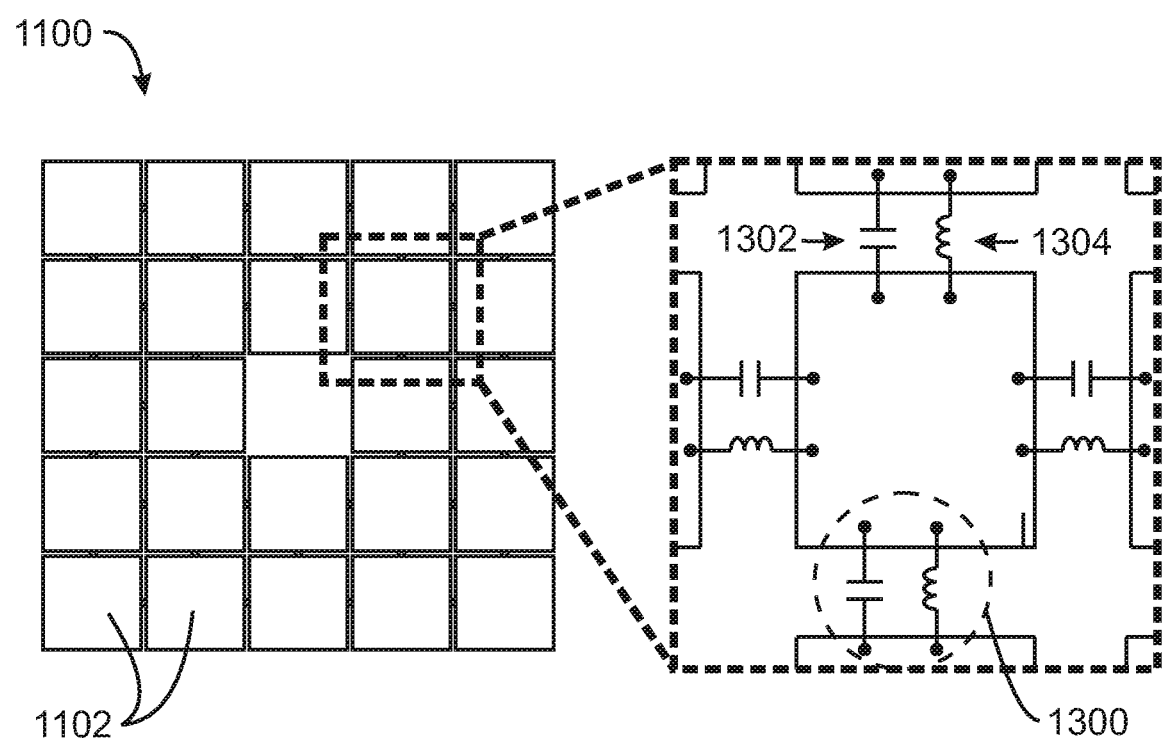
FIG. 13 is an example of a patch array that can be used in combination with a ferrite structure to form a field shaper.

FIG. 13 is an example of a patch array that can be used in combination with a ferrite structure to form a field shaper. The patch array 1100 shown in FIG. 13 includes an array of rectangular conductive patches 1102 with gaps between the patches 1102. Each patch 1102 is a flat panel of conductive material, such as aluminum, copper, other metals, and conductive polymers. Each patch 1102 is coupled to the adjacent patches 1102 through an LC circuit 1300 that spans the gap between the patches 1102. Each LC circuit 1300 includes a capacitive element 1302 and an inductive element 1304 connected in parallel across a respective gap and bridging the gap. The values of the capacitive element 1302 and the inductive element 1304 can be selected so that the resonant frequency of the LC circuits 1300 is the operating frequency of the wireless power transfer system. In some examples, the operating frequency of the wireless power transfer system will be about 6.78 MHz.

At the operating frequency, high impedance is created by the resonance of the parallel LC circuit 1300, which prevents current from flowing between the patches 1102. This causes the current induced on the patch array 1100 by the transmit coil to be noncontinuous. At other frequencies, the current can flow through the patches 1102 due to low impedance. The induced current on the patch array 1100 becomes continuous and causes a decrease in the current intensity at the transmit coil. In this way, unintentional radiation can be effectively suppressed with the frequency-selective patch array 1100.

The dimensions of the patch array 1100 can be determined experimentally and will depend on the desired operating frequency. For an operating frequency of 6.78 MHz, the patch array 1100 may include an array of 25 square patches, each of which is about 50 millimeters (mm) on a side. The gap between patches 1102 may be about 2 mm. These example dimensions result in a patch array 1100 that is about 258 millimeters by 258 millimeters. The number of patches 1102 may be increased or decreased to be suitable for the size of the transmit coil being shielded. The patch array 1100 may be equal to or larger that the area covered by the transmit coil. In an example in which the patch array 140 includes only a single turn, the patch array 140 may be limited to an outer perimeter of patches 202 that generally follows the contour of the single turn.

Figure 14:
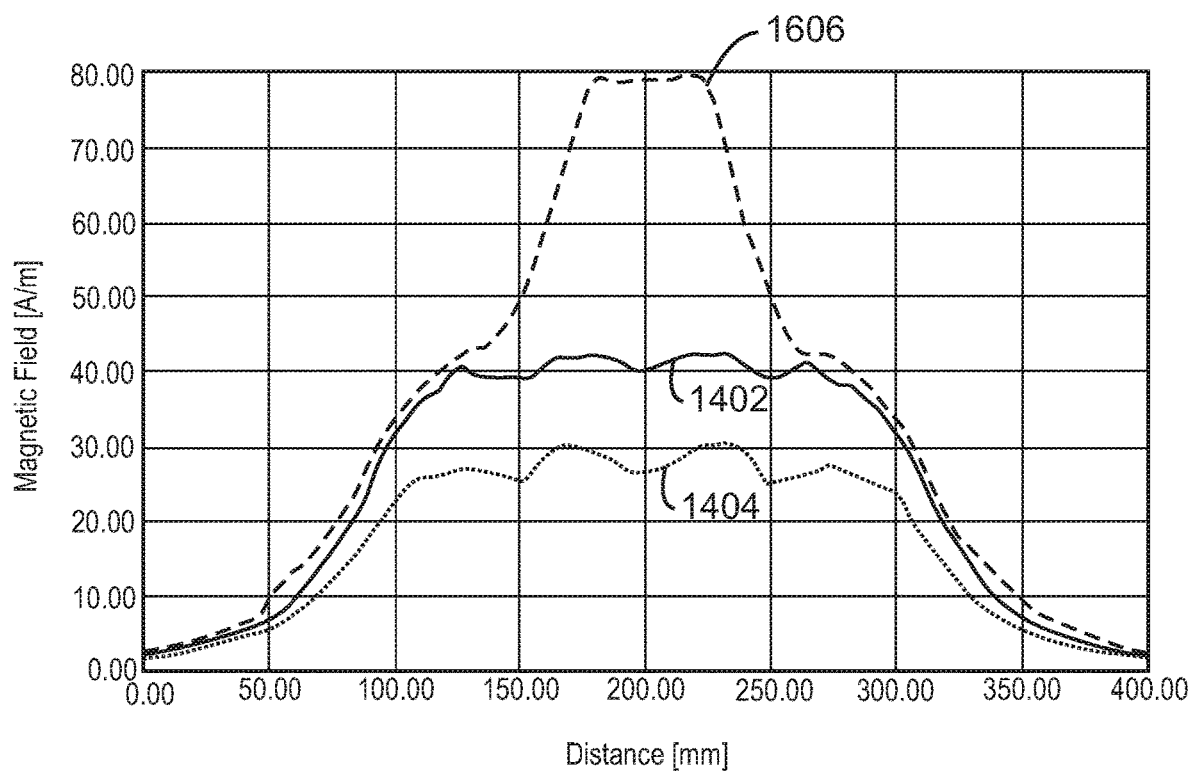
FIG. 14 is a graph of the magnetic field strength for a transmit coil with the field shaping ferrite structure and patch array.

FIG. 14 is a graph of the magnetic field strength for a transmit coil with the field shaping ferrite structure and patch array. More specifically, the graph of FIG. 14 represents simulated magnetic field values for a transmit coil with field shaping ferrite structure and patch array of the type shown in FIGS. 11 and 12. The X-axis represents distance across the transmit coil in the x-direction, wherein the center of the coil is at 200 mm The Y-axis represents the simulated magnetic field strength measured in Amperes per meter at a constant distance above the transmit coil.

The solid line 1402 represents the magnetic field strength for a transmit coil only, i.e., with no ferrite structure or patch array. The dotted line 1404 represents a transmit coil with a patch array and no ferrite structure. The dashed line 1606 represents a transmit coil with a patch array and a ferrite structure as shown in FIGS. 11 and 12. As shown in FIG. 14, the patch array tends to reduce the magnetic field intensity compared to the transmit coil alone. However, the presence of the ferrite structure in addition to the patch array increases the magnetic field strength and mitigates the magnetic field reduction caused by the patch array.

Figure 15:
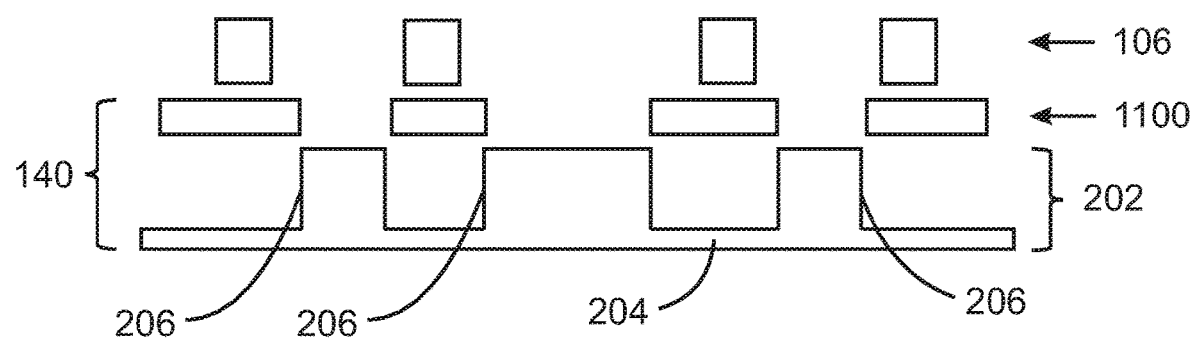
FIG. 15 is a cross sectional side view of another example of a transmit coil with a field shaper that includes a ferrite structure and a patch array.

FIG. 15 is a cross sectional side view of another example of a transmit coil with a field shaper that includes a ferrite structure and a patch array. In this example, two turns of the transmit coil 106 are shown. Below the transmit coil 106 is the patch array 1100. In this example, the patches of the patch array 1100 are positioned below the turns of the transmit coil 106, and there are gaps in the patch array 1100 between the turns of the transmit coil 106. Below the patch array 1100 is the ferrite structure 202. The ferrite structure includes the flat sheet 204 and several projections 206. The projections 206 are positioned between the turns of the transmit coil 106 and in the gaps between the patches of the patch array 1100.

Figure 16:
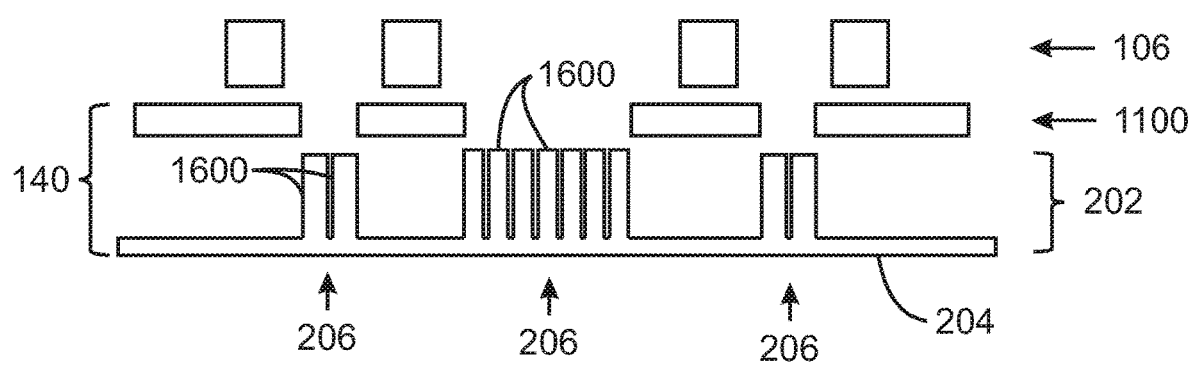
FIG. 16 is a cross sectional side view of another example of a transmit coil with a field shaper that includes a ferrite structure and a patch array.

FIG. 16 is a cross sectional side view of another example of a transmit coil with a field shaper that includes a ferrite structure and a patch array. The example field shaper of FIG. 16 is similar to the field shaper shown in FIG. 15. The example field shaper of FIG. 16 includes the patch array 1100 with patches that are positioned below the turns of the transmit coil 106, and the ferrite structure with projections 206 that are positioned between the turns of the transmit coil 106 and in the gaps between the patches of the patch array 1100. However, in this example the projections 206 include a matrix of individual fingers 1600. The fingers 1600 may be any suitable shape and size, including the configurations described above in relation to FIGS. 5, 7, and 9. Furthermore, the projections 206 may be divided into any suitable number of fingers, including 2-by-2, 3-by-3, 4-by-4, 6-by-6, or more.

Figure 17:
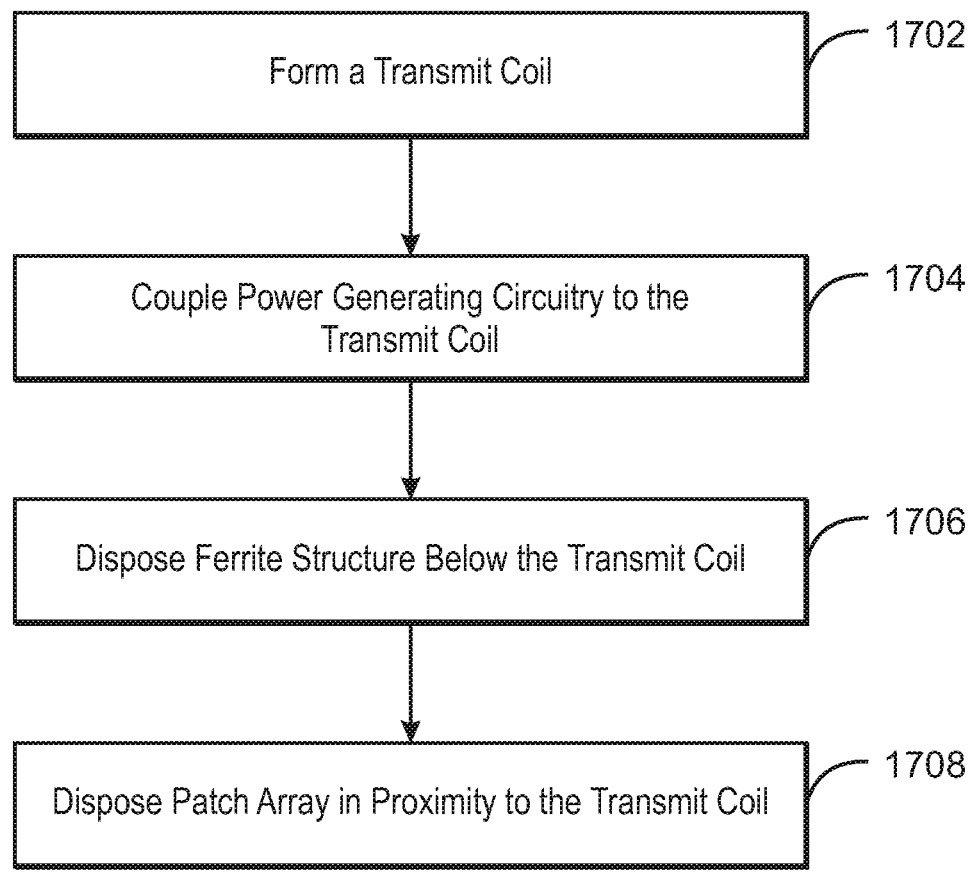
FIG. 17 is a process flow diagram of a method of manufacturing a transmit coil with a field shaper.

FIG. 17 is a process flow diagram of a method of manufacturing a transmit coil with a field shaper. The method may begin at block 1702.

At block 1702, a transmit coil is formed. The transmit coil is configured to generate a magnetic field to wirelessly power a device within an active wireless charging area. The transmit coil includes at least one turn, and can also include several turns. The dimensions of the turns may be selected to focus the magnetic energy within the active charging area.

At block 1704, a power generating circuitry is conductively coupled to the transmit coil. The power generating circuitry is configured to deliver current to the transmit coil to generate the magnetic field at a desired frequency or frequency range.

At block 1706, a ferrite structure disposed below the transmit coil. The ferrite structure comprising a flat sheet and a projection of ferrite material projecting above the flat sheet. The ferrite structure may be any of the example ferrite structures described above.

At block 1708, a patch array may be disposed in proximity to the transmit coil. The patch array may be disposed in parallel to the transmit coil either above or below the transmit coil. In some embodiments, the patch array is disposed between the ferrite structure and the transmit coil. The patch array is configured to reduce the strength of the magnetic field generated by the transmit coil at frequencies outside of the operating frequency during operation of the power transmitting unit. The patch array may be any suitable frequency selective patch array, including one of the patch arrays described above. In some embodiments, the patch array is omitted and block 1708 is not performed.

The method 1700 should not be interpreted as meaning that the blocks are necessarily performed in the order shown. Furthermore, fewer or greater actions can be included in the method 1700 depending on the design considerations of a particular implementation.

EXAMPLES

Example 1 is a power transmitting unit with a field shaper. The power transmitting unit includes a transmit coil configured to generate a magnetic field to wirelessly power a device within an active wireless charging area, and a power generating circuitry to deliver current to the transmit coil to generate the magnetic field. The power transmitting unit also includes a ferrite structure disposed below the transmit coil. The ferrite structure includes a flat sheet and a projection of ferrite material projecting above the flat sheet.

Example 2 includes the power transmitting unit with a field shaper of example 1, including or excluding optional features. In this example, the projection of ferrite material includes a single projection disposed below a center of the transmit coil.

Example 3 includes the power transmitting unit with a field shaper of any one of examples 1 to 2, including or excluding optional features. In this example, the projection of ferrite material includes a plurality of fingers with equal height, wherein each finger has an aspect ratio of two or greater.

Example 4 includes the power transmitting unit with a field shaper of any one of examples 1 to 3, including or excluding optional features. In this example, the projection of ferrite material includes a plurality of fingers of varying height and varying aspect ratio.

Example 5 includes the power transmitting unit with a field shaper of any one of examples 1 to 4, including or excluding optional features. In this example, the projection of ferrite material includes a plurality of fingers including a first set of fingers at a center of the projection and at least a second set of fingers at a periphery of the projection, wherein the first set of fingers at the center of the projection have a higher aspect ratio than the second set of fingers at the periphery of the projection.

Example 6 includes the power transmitting unit with a field shaper of any one of examples 1 to 5, including or excluding optional features. In this example, the projection of ferrite material includes a plurality of fingers including a first set of fingers at a center of the projection and at least a second set of fingers at a periphery of the projection, wherein the first set of fingers at the center of the projection have a lower aspect ratio than the second set of fingers at the periphery of the projection.

Example 7 includes the power transmitting unit with a field shaper of any one of examples 1 to 6, including or excluding optional features. In this example, the power transmitting unit with a field shaper includes a patch array disposed between the transmit coil and the ferrite structure. Optionally, the patch array includes an array of conductive patches, wherein each of the conductive patches is coupled to an adjacent conductive patch of the patch array through a resonant circuit. Optionally, the resonant circuit includes an LC circuit including a capacitor and an inductor in parallel.

Example 8 includes the power transmitting unit with a field shaper of any one of examples 1 to 7, including or excluding optional features. In this example, the power transmitting unit is built into a table top.

Example 9 is a method of manufacturing a power transmitting unit. The method includes forming a transmit coil configured to generate a magnetic field to wirelessly power a device within an active wireless charging area, and conductively coupling a power generating circuitry to the transmit coil. The power generating circuitry is to deliver current to the transmit coil to generate the magnetic field. The method also includes disposing a ferrite structure disposed below the transmit coil. The ferrite structure includes a flat sheet and a projection of ferrite material projecting above the flat sheet.

Example 10 includes the method of example 9, including or excluding optional features. In this example, the projection of ferrite material includes a single projection disposed below a center of the transmit coil.

Example 11 includes the method of any one of examples 9 to 10, including or excluding optional features. In this example, the projection of ferrite material includes a plurality of fingers with equal height, wherein each finger has an aspect ratio of two or greater.

Example 12 includes the method of any one of examples 9 to 11, including or excluding optional features. In this example, the projection of ferrite material includes a plurality of fingers of varying height and varying aspect ratio.

Example 13 includes the method of any one of examples 9 to 12, including or excluding optional features. In this example, the projection of ferrite material includes a plurality of fingers including a first set of fingers at a center of the projection and at least a second set of fingers at a periphery of the projection, wherein the first set of fingers at the center of the projection have a higher aspect ratio than the second set of fingers at the periphery of the projection.

Example 14 includes the method of any one of examples 9 to 13, including or excluding optional features. In this example, the projection of ferrite material includes a plurality of fingers including a first set of fingers at a center of the projection and at least a second set of fingers at a periphery of the projection, wherein the first set of fingers at the center of the projection have a lower aspect ratio than the second set of fingers at the periphery of the projection.

Example 15 includes the method of any one of examples 9 to 14, including or excluding optional features. In this example, the method includes disposing a patch array between the transmit coil and the ferrite structure. Optionally, the patch array includes an array of conductive patches, wherein each of the conductive patches is coupled to an adjacent conductive patch of the patch array through a resonant circuit. Optionally, the resonant circuit includes an LC circuit including a capacitor and an inductor in parallel.

Example 16 includes the method of any one of examples 9 to 15, including or excluding optional features. In this example, the method includes disposing the power transmitting unit into a table top.

Example 17 is a power transmitter with a field shaper. The power transmitter includes a transmit coil configured to generate a magnetic field to wirelessly power a device within an active wireless charging area, and electrical terminals to couple the transmit coil to an electrical power source. The power transmitter also includes a ferrite structure disposed below the transmit coil. The ferrite structure including a flat sheet and a projection of ferrite material projecting above the flat sheet.

Example 18 includes the power transmitter with a field shaper of example 17, including or excluding optional features. In this example, the projection of ferrite material includes a single projection disposed below a center of the transmit coil.

Example 19 includes the power transmitter with a field shaper of any one of examples 17 to 18, including or excluding optional features. In this example, the projection of ferrite material includes a plurality of fingers with equal height, wherein each finger has an aspect ratio of two or greater.

Example 20 includes the power transmitter with a field shaper of any one of examples 17 to 19, including or excluding optional features. In this example, the projection of ferrite material includes a plurality of fingers of varying height and varying aspect ratio.

Example 21 includes the power transmitter with a field shaper of any one of examples 17 to 20, including or excluding optional features. In this example, the projection of ferrite material includes a plurality of fingers including a first set of fingers at a center of the projection and at least a second set of fingers at a periphery of the projection, wherein the first set of fingers at the center of the projection have a higher aspect ratio than the second set of fingers at the periphery of the projection.

Example 22 includes the power transmitter with a field shaper of any one of examples 17 to 21, including or excluding optional features. In this example, the projection of ferrite material includes a plurality of fingers including a first set of fingers at a center of the projection and at least a second set of fingers at a periphery of the projection, wherein the first set of fingers at a center of the projection have a lower aspect ratio than the second set of fingers at the periphery of the projection.

Example 23 includes the power transmitter with a field shaper of any one of examples 17 to 22, including or excluding optional features. In this example, the power transmitter with a field shaper includes a patch array disposed between the transmit coil and the ferrite structure. Optionally, the patch array includes an array of conductive patches, wherein each of the conductive patches is coupled to an adjacent conductive patch of the patch array through a resonant circuit. Optionally, the resonant circuit includes an LC circuit including a capacitor and an inductor in parallel.

Example 24 includes the power transmitter with a field shaper of any one of examples 17 to 23, including or excluding optional features. In this example, the power transmitter is built into a table top.

Example 25 is an apparatus with a field shaper. The apparatus includes means for generating a magnetic field to wirelessly power a device within an active wireless charging area, and means for delivering current to the means for generating the magnetic field. The apparatus also includes means for shaping the magnetic field. The means for shaping the magnetic field includes a flat sheet of ferrite material disposed below the means for generating the magnetic field, and a projection of ferrite material projecting above the flat sheet.

Example 26 includes the apparatus of example 25, including or excluding optional features. In this example, the projection of ferrite material includes a single projection disposed below the means for generating the magnetic field.

Example 27 includes the apparatus of any one of examples 25 to 26, including or excluding optional features. In this example, the projection of ferrite material includes a plurality of fingers with equal height, wherein each finger has an aspect ratio of two or greater.

Example 28 includes the apparatus of any one of examples 25 to 27, including or excluding optional features. In this example, the projection of ferrite material includes a plurality of fingers of varying height and varying aspect ratio.

Example 29 includes the apparatus of any one of examples 25 to 28, including or excluding optional features. In this example, the projection of ferrite material includes a plurality of fingers including a first set of fingers at a center of the projection and at least a second set of fingers at a periphery of the projection, wherein the first set of fingers at the center of the projection have a higher aspect ratio than the second set of fingers at the periphery of the projection.

Example 30 includes the apparatus of any one of examples 25 to 29, including or excluding optional features. In this example, the projection of ferrite material includes a plurality of fingers including a first set of fingers at a center of the projection and at least a second set of fingers at a periphery of the projection, wherein the first set of fingers at the center of the projection have a lower aspect ratio than the second set of fingers at the periphery of the projection.

Example 31 includes the apparatus of any one of examples 25 to 30, including or excluding optional features. In this example, the means for shaping the magnetic field includes a patch array disposed between the flat sheet of ferrite material and the means for generating the magnetic field. Optionally, the patch array includes an array of conductive patches, wherein each of the conductive patches is coupled to an adjacent conductive patch of the patch array through a resonant circuit. Optionally, the resonant circuit includes an LC circuit including a capacitor and an inductor in parallel.

Example 32 includes the apparatus of any one of examples 25 to 31, including or excluding optional features. In this example, the apparatus is built into a table top.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A power transmitting unit with a field shaper, comprising:
a transmit coil configured to generate a magnetic field to wirelessly power a device within an active wireless charging area, the transmit coil comprising one or more conductive turns lying in a common plane;
a power generating circuitry to deliver current to the transmit coil to generate the magnetic field; and
a ferrite structure disposed below the transmit coil to control an electromagnetic field distribution within the active charging area, the ferrite structure comprising a flat sheet and a projection of ferrite material projecting from the flat sheet through an innermost turn of the transmit coil to a height above the plane of the transmit coil;
wherein the projection comprises a matrix of fingers of varying height and varying aspect ratio, and the flat sheet and the projection with the matrix of fingers are integrally formed.

2. The power transmitting unit of claim 1, wherein each finger in the matrix of fingers has an aspect ratio of two or greater.

3. The power transmitting unit of claim 1, wherein the matrix of fingers comprises a first set of fingers at a center of the projection and at least a second set of fingers at a periphery of the projection, wherein the first set of fingers at the center of the projection have a higher aspect ratio than the second set of fingers at the periphery of the projection.

4. The power transmitting unit of claim 1, wherein the matrix of fingers comprises a first set of fingers at a center of the projection and at least a second set of fingers at a periphery of the projection, wherein the first set of fingers at the center of the projection have a lower aspect ratio than the second set of fingers at the periphery of the projection.

5. The power transmitting unit of claim 1, comprising a patch array disposed between the transmit coil and the ferrite structure.

6. The power transmitting unit of claim 5, wherein the patch array comprises an array of conductive patches, wherein each of the conductive patches is coupled to an adjacent conductive patch of the patch array through a resonant circuit.

7. The power transmitting unit of claim 6, wherein the resonant circuit comprises an LC circuit comprising a capacitor and an inductor in parallel.

8. The power transmitting unit of claim 1, wherein the power transmitting unit is built into a table top.

9. A method of manufacturing a power transmitting unit, comprising:
forming a transmit coil configured to generate a magnetic field to wirelessly power a device within an active wireless charging area, the transmit coil comprising one or more conductive turns lying in a common plane;
conductively coupling a power generating circuitry to the transmit coil, the power generating circuitry to deliver current to the transmit coil to generate the magnetic field; and
disposing a ferrite structure below the transmit coil to control an electromagnetic field distribution within the active charging area, the ferrite structure comprising a flat sheet and a projection of ferrite material projecting from the flat sheet through an innermost turn of the transmit coil to a height above the plane of the transmit coil,
wherein the projection comprises a matrix of fingers of varying height and varying aspect ratio, and the flat sheet and the projection with the matrix of fingers are integrally formed.

10. The method of claim 9, wherein each finger in the matrix of fingers has an aspect ratio of two or greater.

11. The method of claim 9, wherein the projection of matrix of fingers comprises a first set of fingers at a center of the projection and at least a second set of fingers at a periphery of the projection, wherein the first set of fingers at the center of the projection have a higher aspect ratio than the second set of fingers at the periphery of the projection.

12. The method of claim 9, wherein the matrix of fingers comprises a first set of fingers at a center of the projection and at least a second set of fingers at a periphery of the projection, wherein the first set of fingers at the center of the projection have a lower aspect ratio than the second set of fingers at the periphery of the projection.

13. The method of claim 9, comprising disposing a patch array between the transmit coil and the ferrite structure.

14. The method of claim 13, wherein the patch array comprises an array of conductive patches, wherein each of the conductive patches is coupled to an adjacent conductive patch of the patch array through a resonant circuit.

15. The method of claim 14, wherein the resonant circuit comprises an LC circuit comprising a capacitor and an inductor in parallel.

16. The method of claim 9, comprising disposing the power transmitting unit into a table top.

17. A power transmitter with a field shaper, comprising:
a transmit coil configured to generate a magnetic field to wirelessly power a device within an active wireless charging area, the transmit coil comprising one or more conductive turns lying in a common plane;
electrical terminals to couple the transmit coil to an electrical power source; and
a ferrite structure disposed below the transmit coil to control an electromagnetic field distribution within the active charging area, the ferrite structure comprising a flat sheet and a projection of ferrite material projecting from the flat sheet through an innermost turn of the transmit coil to a height above the plane of the transmit coil,
wherein the projection comprises a matrix of fingers of varying height and varying aspect ratio, and the flat sheet and the projection with the matrix of fingers are integrally formed.

18. The power transmitter of claim 17, wherein each finger in the matrix of fingers has an aspect ratio of two or greater.

19. The power transmitter of claim 17, wherein the matrix of fingers comprises a first set of fingers at a center of the projection and at least a second set of fingers at a periphery of the projection, wherein the first set of fingers at the center of the projection have a higher aspect ratio than the second set of fingers at the periphery of the projection.

* * * * *